US005773103A

United States Patent [19]

Ciora, Jr. et al.

[11] Patent Number: 5,773,103
[45] Date of Patent: Jun. 30, 1998

[54] INORGANIC MEMBRANES USING POROUS CORDIERITE SUPPORT

[75] Inventors: Richard J. Ciora, Jr., Butler; Paul K. T. Liu, Pittsburgh, both of Pa.

[73] Assignee: Media and Process Technology Inc., Pittsburgh, Pa.

[21] Appl. No.: 509,415

[22] Filed: Jul. 31, 1995

[51] Int. Cl.[6] .................................................. B32B 9/00
[52] U.S. Cl. .................. 428/34.6; 428/307.7; 428/312.8; 428/325; 428/328; 428/329; 428/699; 428/701; 428/702; 210/500.21; 210/506
[58] Field of Search .............................. 428/34.6, 306.6, 428/307.7, 312.8, 325, 328, 329, 699, 701, 702, 116; 210/500.21, 500.26, 506

[56] References Cited

U.S. PATENT DOCUMENTS

| | | | |
|---|---|---|---|
| 4,069,157 | 1/1978 | Hoover et al. | 210/321 |
| 4,251,377 | 2/1981 | Schleinitz | 210/510.1 |
| 4,562,021 | 12/1985 | Alary | 210/500.2 |
| 4,642,210 | 2/1987 | Ogawa | 428/307.7 |
| 4,781,831 | 11/1988 | Goldsmith | 210/247 |
| 4,894,160 | 1/1990 | Abe et al. | 210/510.1 |
| 4,968,426 | 11/1990 | Hay | 210/490 |
| 4,971,696 | 11/1990 | Abe et al. | 210/500.25 |
| 4,983,423 | 1/1991 | Goldsmith | 427/230 |
| 5,308,494 | 5/1994 | Brandon | 210/639 |

FOREIGN PATENT DOCUMENTS

| | | | |
|---|---|---|---|
| 1140003 | 1/1983 | Canada | 210/500.21 |
| 344011 | 11/1989 | European Pat. Off. | 210/500.21 |
| 2071639 | 9/1981 | United Kingdom | 428/307.7 |
| 9003831 | 4/1990 | WIPO . | |
| 93/000987 | 1/1993 | WIPO | 210/500.21 |

*Primary Examiner*—Timothy M. Speer
*Attorney, Agent, or Firm*—Andrew Alexander

[57] ABSTRACT

A ceramic fired composite filter media having a uniform pore size, the media consisting essentially of a porous cordierite substrate having a surface having pores of non-uniform diameter, the diameter ranging from <1 to 200 μm; and a layer of porous ceramic oxide having pores having a uniform diameter bonded to the surface of the cordierite substrate, the layer of ceramic oxide comprised of ceramic oxide particles having a particle size sufficiently large to avoid substantial penetration of the pores in the surface of the cordierite.

14 Claims, 3 Drawing Sheets

INORGANIC MEMBRANES USING POROUS CORDIERITE SUPPORT

BACKGROUND OF THE INVENTION

This invention relates to a composite comprised of a porous cordierite substrate support and a coating of a porous ceramic oxide membrane and a method of forming a composite having a membrane layer. In one aspect, the invention relates to the deposition of a ceramic layer as an intermediate layer to mask the undesirable porous structure of cordierite for subsequent deposition of layers with a smaller pore size.

Ceramic membranes have been widely used in liquid phase separations in pharmaceutical, food, beverage and other industries. Recently, they have also been explored for gas separations and catalytic reactions. Compared with their polymeric counterparts, ceramic membranes are more desirable because of their improved thermal and chemical stabilities. However, the problem with ceramic membranes is their high capital cost. Thus, they only have been considered for niche applications where the high capital cost can be justified. The high cost of ceramic membranes results primarily from the requirement of high purity materials with a narrow particle size distribution which are necessary for the base substrate. The substrate is then used as a support for subsequent deposition of additional membrane layers. Another cost associated with ceramic membranes is the high firing temperature (>1600° C.) required to sinter the large particles to form the base support of the membrane.

State-of-the-art ceramic membranes consist of a multilayered asymmetric structure, specifically, a base support and several thin layers deposited thereon. The support is generally a thick, very porous structure which is used to provide strength to the membrane element without introducing significant flow resistance. The support can be fabricated from the high purity $\alpha$-$Al_2O_3$ about 3 to 30 mm thick depending upon the configuration (i.e., tubular or monolithic) with a nominal pore size of 10 to 15 microns. Additional layers with progressively smaller pore sizes are normally deposited on this support, i.e., a 0.01 to 0.02 mm thick $\alpha$-$Al_2O_3$ layer with a nominal 0.8 micron pore size and a 0.01 to 0.02 mm thick $\alpha$-$Al_2O_3$ layer with a nominal 0.2 micron pore size. This composite asymmetric membrane containing the 0.2 micron pore size layer is sometimes used as a microfilter. Also, this microfilter can be used as a support for an ultrafiltration layer. A separation layer can be deposited with a pore size <0.2 micron via slip casting of sols prepared from alkoxides of aluminum or zirconium. Depending upon the firing temperature (ranging from 400°0 to >1400° C.), a membrane with a pore size between 40Å and less than 0.2 micron can thus be obtained.

Examples of such membranes are set forth in the following patents which are incorporated herein by reference.

For example, U.S. Pat. No. 4,971,696 discloses a multilayer inorganic porous membrane consisting of a monolayer or multilayer porous support having at least one surface integrally formed thereon with a porous thin layer having an average pore size less than that of the porous support, wherein a maximum pore size in the support surface is defined to be from 1 to 250 times an average pore size in the thin layer. The multilayer porous membrane is superior in preventing the occurrence of pin holes and cracks therein thereby enhancing precision of the filtration and separation.

U.S. Pat. No. 4,781,831 discloses a cross-flow filtration device which separates a feed stock into filtrate and retentate, including a structure of porous material which defines a plurality of passageways extending longitudinally from the feed end of the structure to a retentate end, and a number of filtrate conduits within the structure for carrying filtrate from within the structure toward a filtrate collection zone. The filtrate conduits provide paths of lower flow resistance than that of alternative flow paths through the porous material, and the structure is constructed such that the filtrate conduits are distributed among the passageways to provide low pressure drop flow paths for filtrate flow from the passageways through the porous material to nearby filtrate conduits. The cross-flow filtration device can also be utilized as a membrane support for a device for cross-flow microfiltration, ultrafiltration, reverse osmosis, gas separations or pervaporation.

U.S. Pat. No. 4,983,423 discloses a porous inorganic membrane for use with a membrane device having a porous support, the membrane including refractory particles bound to each other and to the support by a thermally reactive inorganic binder which reacts at a temperature below that at which the refractory particles react. Further, a method of forming porous inorganic membrane on a support by applying a coating of a mixture of refractory particles and a thermally reactive inorganic binder to the support is disclosed. The inorganic binder reacts at a first temperature lower than a second temperature at which the refractory particles sinter. The method further includes firing the support to a firing temperature at least as high as the first temperature and less than the second temperature to react the inorganic binder, and cooling the support to form the porous membrane.

U.S. Pat. No. 4,894,160 discloses a honeycomb structure for fluid filtration including a support of porous ceramic material having a multiplicity of axially parallel passageways extending therethrough and uniformly spaced by porous partition walls to permit flow of fluid under pressure passing therethrough and a selective membrane coated onto the surface of the passageways to separate one or more components from the fluid and to permit flow of filtrate passing therethrough to be carried through the porous partition walls to the exterior surface of the partition walls for collection. In the honeycomb structure, the partition walls are formed to permit the passage of filtrate at a flow quantity more than twenty times the flow quantity of filtrate passing through the selective membrane and partition walls, and an average pore size of the selective membrane is about from 10 to 10000 angstroms.

U.S. Pat. No. 4,069,157 discloses a ceramic support having a multiplicity of parallel passageways therethrough, the passageways being coated with an ultrafiltration membrane, the support having a specific surface area to volume ratio and defined permeability characteristics.

U.S. Pat. No. 4,251,377 discloses a homogeneous (not multilayered) porous ceramic structure as a filter, which is composed of cordierite ceramic and a quantity of $\alpha$-alumina substantially in excess of that required to form the cordierite. The product formed from this composition demonstrates improved porous characteristics and mechanical strength.

Thus, in spite of these prior art materials, there is a great need for a composite comprised of an inorganic porous support with a narrow well-defined pore size distribution and smooth defect-free surface for the deposition of a membrane thereon. Additionally, the support material should have a high melting point which provides sufficient temperature stability for sintering of a variety of metal or ceramic oxide membrane layers deposited thereon.

SUMMARY OF THE INVENTION

It is an object of this invention to provide a low cost porous ceramic substrate, which may have a wide ill-defined pore size distribution, for use as a porous support for inorganic membranes.

It is a further object of this invention to provide a low cost ceramic substrate as the support for depositing a crack-free integral membrane layer thereon without use of a reactive inorganic binder.

It is a further object of this invention to form a ceramic oxide layer with a narrow well-defined pore size distribution on a support having an ill-defined pore size distribution.

It is a further object of the invention to use the ceramic membrane for subsequent deposition of the membrane with a smaller pore size.

In accordance with these objects, disclosed is a ceramic fired composite filter media having a uniform pore size, the media consisting essentially of a porous cordierite substrate having a surface having pores of non-uniform diameter, the diameter ranging from <1 to 200 $\mu$m; and a layer of porous ceramic oxide having pores having a uniform diameter bonded to the surface of the cordierite substrate, the layer of ceramic oxide comprised of ceramic oxide particles having a particle size sufficiently large to avoid substantial penetration of the pores in the surface of the cordierite.

DETAILED DESCRIPTION OF THE PREFERRED EMBODIMENTS

Figure 1:
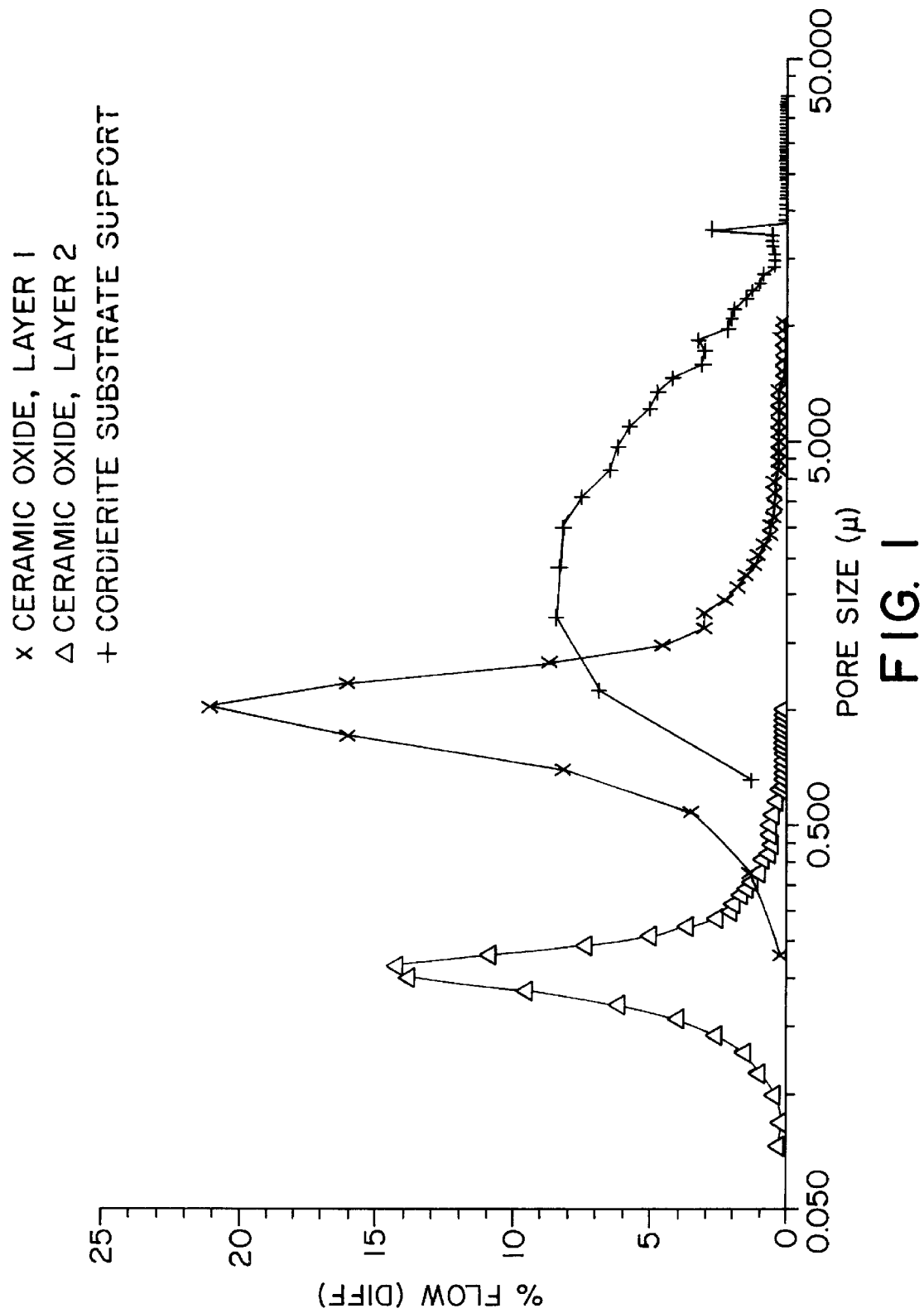
FIG. 1 shows liquid displacement porometry of cordierite substrate and ceramic oxide layers deposited thereon.

The present invention comprises a ceramic fired composite filter or separation media. The media is comprised of a substrate of porous cordierite having a surface containing pores having a substantially non-uniform diameter and a layer of ceramic oxide bonded thereto having a substantially uniform pore size. For example, the pores that contribute to flow through the cordierite substrate can have a diameter that ranges from <1 to >20 $\mu$m. Further, the surface can have significantly larger defects such as cracks, craters and dead-end pores that do not contribute to flow through the cordierite substrate.

By the use of the term "cordierite" as used herein it is meant a multicomponent mixed oxide comprised of approximately 47 to 62 mol. % $SiO_2$, 10 to 23 mol. % MgO and 21 to 38 mol. % $Al_2O_3$ or as defined in Corning Celcor® Dieselfilters Brochure #CEL-DSL 6/87 MA, incorporated herein by reference. Further, the cordierite material has a pore volume of 0.01 to 0.5 cc/g. Typical cordierite useful in the invention is comprised of 55.6 mol. % $SiO_2$, 22.2 mol. % MgO and 22.2 mol. % $Al_2O_3$, a pore volume of 0.1 cc/g and a pore diameter that ranges from <1 to >20 $\mu$m. Further, because the cordierite material is used as a substrate, it can be provided in any desired shape suitable to the filtration or separation operation. For example, the cordierite can be provided in the shape of individual tubes or a monolith, plate, block, etc., or any array of tubes to provide parallel passages that may have a square, circular or other configuration. Any and all shapes are contemplated within the perview of the invention.

A porous cordierite ceramic substrate in the configuration of tube, monolith, or others, such as an array of parallel passageways with a circular, square or other shapes, can be covered with a layer of ceramic oxide with a uniform pore size distribution, which tightly adheres to the support surface. Cordierite porous tubes useful in the invention containing square channels can be obtained from commercial manufacturers. Such tubes generally have a wide pore size distribution, for example, a pore size distribution between 0.2 and 17.8 microns as determined by liquid displacement porometry (Coulter Instrument) although pore >17.8 microns and <0.2 microns in size may also be present in the substrate. The average pore size obtained by liquid displacement porometry using a Coulter Porometer was 5.6 $\mu$m. Additionally, much larger surface defects on the order of 50 to >100 $\mu$m were present. These surface defects were undetectable via liquid displacement porometry (since they are not through pores) but can be seen in mercury porosimetry data and scanning electron microscope photographs of the structure. Since the former technique uses flow of gas through the pores, only pores that contribute to the gas flux through the support were measured. By comparison, mercury porosimetry measures total pore volume, some of which may be dead end pores which are unavailable for flow. Hence, a dead end pore would be measured by mercury porosimetry, but would be undetectable using liquid displacement porometry. As a result, liquid displacement porometry is more informative in providing the pore size distribution with respect to the functional performance of a membrane. By comparison, mercury porosimetry and SEM analysis can be useful for characterizing intrinsic porous structure and gross defects in the surface of the support, which may or may not contribute to the flow through porosity of the membrane, but are important to the deposition of crack-free membrane layers.

Thus, it will be seen that the cordierite useful in the present invention can have a wide range of pore diameter and thus is not effective and efficient for selective removal of oil emulsions from water, for potable water treatment and for gas separation, for example.

To provide a filter or separation media having a uniform pore size diameter, a layer of ceramic oxide particles is bonded to the surface of the cordierite. However, to insure a filter membrane or separation membrane having the desired selectivity, the ceramic oxide particles with substantially uniform particle size are selected to provide a pore size having a substantially uniform diameter. Further, the ceramic oxide particles have a size selected to resist or prevent substantial intrusion of the oxide particles into the pores of the cordierite support thereby only minimally increasing flow resistance through the support material.

Any ceramic oxide that bonds to the cordierite may be employed. Typical ceramic oxide materials that may be employed include alumina, silica, zirconia or titania or combinations thereof.

As noted, the particles employed have a size that resists intrusion into the pores of the cordierite material. For example, in cordierite having a pore size distribution of 0.2 to 17.8 microns, if ceramic oxide particles selected have a particle size of 18 microns or greater than 18 microns, then there will be substantially no intrusion. However, it has been discovered that not all the particles have to be 18 microns or greater to prevent intrusion. Further, to have intrusion of a particle into a pore, the particle has to be lined up with the pore. Because this does not normally happen, it has been discovered that the particles can have a size smaller than the pore size and yet intrusion is not substantial. Thus, ceramic oxide particles can be used wherein the particles have a size equal to or greater than the maximum pore diameter which covers 40% or more, preferably 60% or more and typically 80% or more, of pore volume in the cordierite material. Thus, if the largest pore size was 17.8 microns in diameter, ceramic oxide particles with an average size of 9 microns and greater, for example, may be used with substantially no intrusion into the pores. This average particle size is greater than the maximum diameter of the pores which cover, for example, 60% of the pore volume of the cordierite support. In the present invention, it is desired to use the smallest particle that can be used without substantial intrusion in order that subsequent layers of very fine particles, such as 1 to 2 $\mu$m, can be used.

For purposes of the present invention, the layer of ceramic oxide particles can be 5 to 100$\mu$ thick with a typical thickness being about 50 $\mu$m.

After a layer of ceramic oxide particles has been coated on the surface of the cordierite material to form a composite, the layer is bonded to the cordierite by firing or heating. That is, it has been discovered that the layer of ceramic oxide particles firmly bonds to the cordierite when the combination or composite is heated to a temperature range of 1000° to 1500° C., and typically 1300° to 1430° C. The preferred temperature is the maximum temperature that results in a chemical bonding of the ceramic oxide layer to the cordierite substrate which does not deform the substrate as a result of melting of the cordierite. In this way, very strong bonding of the ceramic oxide particles to the cordierite can be achieved without the use of additives such as glass frits or ceramic oxide particles substantially smaller than the average particle size of the desired ceramic oxide particle layer. The interlayer bonding in this invention is very strong and may be attributed to reaction between $Al_2O_3$ particles and the base cordierite in the interface in addition to the sintering in the interlayer.

When the ceramic oxide particles are bonded as a layer to the surface of the cordierite in this way, a porous ceramic oxide layer is obtained with a uniform pore diameter. For example, when ceramic oxide particles are used having an average particle size of 9 $\mu$m to form a porous ceramic oxide layer, the layer has pore diameter size in the range of 0.2 to 5 $\mu$m, with a peak pore size being about 1 $\mu$m. Thus, it will be seen that the composite filter or separation media can be achieved with a filter having a substantially uniform pore size.

In the present invention, any method may be used that results in a layer of ceramic oxide particles being sufficiently deposited on the cordierite material surface to permit firing or heating. Thus, for example, a suspension containing ceramic oxide particles with a selected particle size can be prepared and deposited on the surface of cordierite substrates. As noted, the particle size can be chosen based upon the pore size and pore volume of the cordierite support. Preferably, the particle size is selected to minimize flow resistance in the ceramic oxide layer. However, the particle size should not be too large and thus be unsuitable for depositing subsequent layers, or be ineffective in masking the wide pore size distribution and large surface defects of the underlying cordierite support.

The ceramic oxide layer can be deposited on the cordierite support by slip casting. To form a stable suspension or slip, the ceramic oxide particles are dispersed in water or other vehicle and additives are added to alter the properties of the slip or cast film. For instance, nitric acid can be added to peptize the oxide particles to prevent flocculation and biological growth, etc. In addition, an organic binder such as poly(vinyl alcohol) may be used to adjust the viscosity of the suspension to facilitate layer deposition by slip casting. The binder may also be used to relieve stresses created during the drying of the layer. However, since the organic binder decomposes and evaporates during firing, it is only a temporary additive and does not impact the final strength of the deposited ceramic oxide layer. The details of suspension/slip preparation and casting can be found in "Inorganic Membranes Synthesis, Characteristics, and Applications" by R. R. Bhave, van Nostrand Reinhold, New York, incorporated herein by reference.

After deposition of the ceramic oxide layer on the cordierite substrate, the combination is fired as noted earlier. Care should be taken to stay below the melting point of the cordierite and below a temperature at which the cordierite can soften and deform significantly. However, the temperatures must be sufficiently high to permit bonding of the ceramic oxide particles to the cordierite material and to permit bonding of the ceramic oxide particles to each other. Normally, the temperature should be at least 1300° C. Utilizing these temperatures for firing, it has been discovered that after cooling, the layer was very tightly attached to the cordierite support. Pore size distribution analysis of this layered support indicates that the effective pore size of the material based upon liquid displacement porometry, is essentially the effective pore size of the deposited layer. The ceramic oxide layer masks the large and wide pore size distribution observed for the cordierite support and eliminates the large surface defects. Additionally, it was found that large defects in the surface of the support can be covered as evidenced by the mercury porosimetry. Further, successive ceramic oxide layers with much smaller pore sizes can be applied. It has been found that when firing at temperatures below about 1000° C., the ceramic oxide layer can be chipped easily from the support in the form of flakes or powder.

The following examples are still further illustrative of the invention:

EXAMPLE 1

Figure 2A:
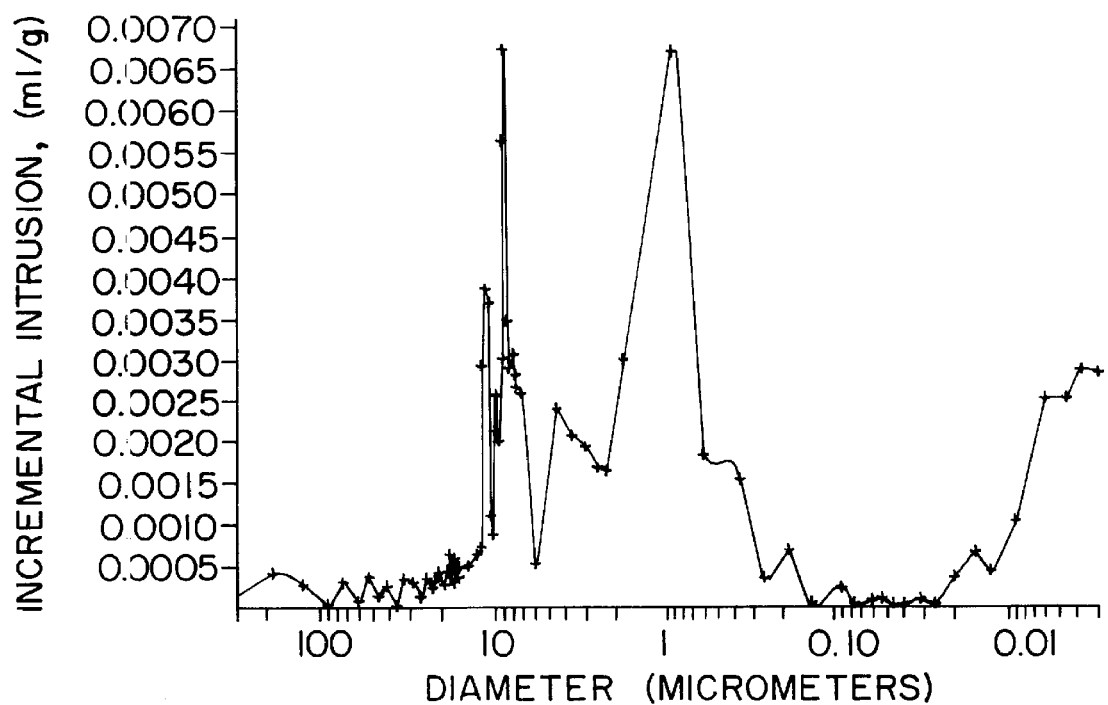
FIG. 2a shows a mercury porosimetry of cordierite substrate in terms of pore diameter vs. incremental intrusion volume.
Figure 2B:
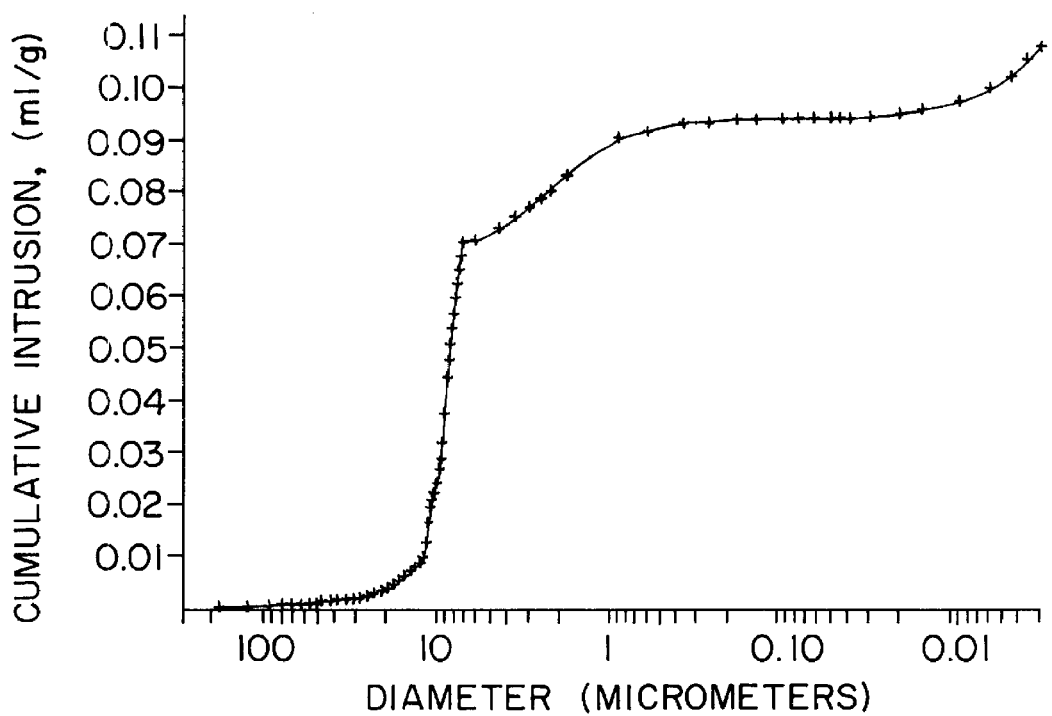
FIG. 2b shows the mercury porosimetry of cordierite substrate in terms of pore diameter vs. cumulative intrusion volume.

A square single channel porous cordierite tube was provided as a membrane support. The single square tube opening was approximately 0.135" and the wall thickness was approximately 0.050". The porosity of the cordierite was determined to be 35% and the maximum and mean pore sizes as determined by liquid displacement porometry are approximately 17.8 and 5.9 $\mu$m. Pore size distributions as determined by liquid displacement porometry (Coulter Porometer) and mercury porosimetry (Micromeretics) are shown in FIGS. 1, 2a and 2b, respectively.

The single square tube was coated with a ceramic layer by slip casting. The ceramic slip material contained the following materials:

45 wt. % 9 micron alumina particles (Alcoa, type A-10);
53.3 wt. % isopropyl alcohol; and
1.7 wt. % poly(acrylic acid).

The slip material was prepared by mixing at high speed for approximately five minutes then stirring on a magnetic stir plate. For purposes of applying a ceramic oxide layer, the tube was filled with slip material and held for several seconds and then drained and then dried in an oven for one hour. This coating procedure was repeated two more times with the same slip material to ensure coverage of the cordierite support.

After drying in the oven, the tube was fired in an electric furnace at 1410° C. for two hours. The heating and cooling rates were 2° C./hr. The upper temperature of 1410° C. provided both excellent interparticulate bonding of the alumina (A-10) layer and excellent bonding of the $Al_2O_3$ layer to the cordierite substrate. The A-10 layer could not be removed without destruction of the cordierite support.

The thickness of the alumina A-10 layer was determined to be approximately 50 μm, and the layer was characterized by liquid displacement and mercury porosimetry. The pore size distributions of the fired $Al_2O_3$ layer on the cordierite tube and the original cordierite tube are given in FIG. 1 for comparison. The pore size distribution of the $Al_2O_3$ layer (layer 1) obtained by liquid displacement porometry shows a maximum and peak pore diameter of approximately 3 and 1 μm, respectively. Additionally, the layer was free of major defects or cracks as evidenced by the narrow pore size distribution. Additional coatings of $Al_2O_3$ or other ceramic oxides (layer 2) having a smaller particle size can be added to provide both a thinner layer and smaller pores.

Clean water flux through the fired $Al_2O_3$ layer on the cordierite support and the bare support were found to be approximately 950 and 1100 liter/m²/hr/bar of the transmembrane pressure, respectively. Thus, it can be seen that a substantial fraction of the original flux was maintained even though an additional layer of ceramic oxide was deposited onto the cordierite support.

Figure 3:
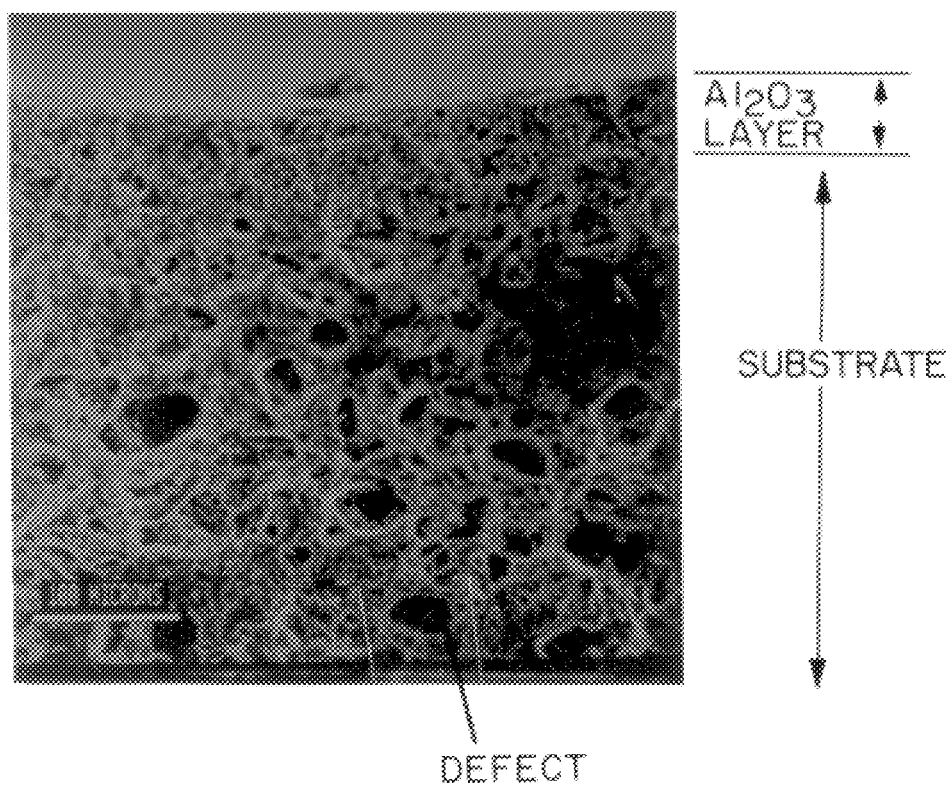
FIG. 3 shows in cross section a SEM photomicrograph of a cordierite as substrate and ceramic oxide layer deposited thereon.

The porous structure of the bare substrate was compared with the substrate after the $Al_2O_3$ membrane layer deposition using mercury porosimetry. The pore size versus pore volume distribution of the bare cordierite support by mercury porosimetry is shown in FIGS. 2a and 2b. A majority of the pores range in size from 0.1 to 18 micron as measured by mercury porosimetry although pore sizes significantly greater than 18 microns and some less than 0.1 micron were measured. The pore size distribution versus percent flow contribution for the same sample measured by the flow-through (liquid displacement) porometry is shown in FIG. 1. Pore sizes ranging from about 0.5 to about 17.8 microns contribute to the majority of the flow. No significant flow was observed for pores greater than 17.8 microns or less than 0.5 microns. This indicates that the pore sizes greater than 18 or less than 0.5 microns, as measured with the mercury porosimeter, result from dead end pores. These dead-end pores are present on the surface of the cordierite support (defects which include craters, cavities or others without a through channel). These dead end pores are not available to contribute to any flow from the permeation standpoint and therefore are not detected using liquid displacement porometry. Such defects are visible in the photomicrograph in FIG. 3. The flow-through porometric analysis of the $Al_2O_3$ coated membrane shown in FIG. 1 indicates that the coated layer has a well-defined pore size distribution between about 0.2 and about 5 microns and that the surface defects have been eliminated. The SEM photomicrograph shown in FIG. 3 offers the visible evidence.

The 9 micron alumina particles were chosen for the $Al_2O_3$ membrane layer because a significant portion, i.e., 63%, of the cumulative pore volume of the support as defined by mercury porosimetry is contributed by pores less than or equal to 9 microns as shown in FIG. 2b. Thus, the deposited A-10 alumina particles could form a smooth transition layer to cover the surface defects while not leaking substantially through the pores in the support (e.g., 0.5 to 17.8 microns as shown in FIG. 1 for the support). This example demonstrates that the layer deposition technique can be used to mask the large surface defects and broad pore size of the support to produce a surface with a well-defined pore size distribution. This layer can then be used for the deposition of subsequent layers with smaller pore sizes, if desired.

EXAMPLE 2

Several membranes were prepared as described in Example 1 and fired at selected temperatures of 1250°, 1300°, 1350°, 1400° or 1410° C. Heating and cooling rates of 2° C./min were utilized. Tubes fired at 1400° and 1410° C. were held at this temperature for two hours. Tubes fired at 1250°, 1300° and 1350° C. were held for five hours. At temperatures above 1435° C., the cordierite tube deformed and/or melted and was unusable.

Comparison of the degree of interparticle bonding and layer attachment at the various firing temperatures was evaluated qualitatively by scraping the $Al_2O_3$ layer with wooden and steel probes. The A-10 layers fired at 1250° and 1300° C. showed the lowest bond strength; the particles could be removed as a powder from the cordierite surface with a wooden probe. Attachment to the cordierite surface was observed but weak. At 1350° C. and above, it was necessary to use the steel probe to damage the layer. Additionally, layer bonding as well as attachment to the cordierite support improved dramatically as the firing temperature was raised. Specifically, attempts to remove the $Al_2O_3$ membrane layer from the sample fired at 1410° C. resulted in destruction of the cordierite substrate while the tube prepared at 1350° C. showed some bond strength but could be removed from the surface without causing much damage to the cordierite support. The tube fired at 1400° C. showed improved bond strength. It will be seen that these levels of bond strength were achieved without additives but rather through the inteparticle and interlayer bonding.

EXAMPLE 3

An $\alpha$-$Al_2O_3$ ceramic tube with a nominal pore size of 10 μm was coated with A-10 type $\alpha$-$Al_2O_3$ having a particle size of about 9 microns using the slip and procedure described in Example 1. The tube was then fired at 1410° C. using the thermal cycle described in Example 1.

Interparticle bonding and attachment of the $\alpha$-$Al_2O_3$ layer to the $\alpha$-$Al_2O_3$ support was tested qualitatively using the procedure described in Example 2. The $\alpha$-$Al_2O_3$ layer was easily removed from the support by scraping with a steel probe and was considerably inferior to the integrity and adhesion of the $\alpha$-$Al_2O_3$ layer fired at 1410° C. on the cordierite support. The strong adhesion of the alumina layer on the cordierite support at this temperature is unique to the cordierite support and is not attributed to the sintering of the $Al_2O_3$ particles alone.

EXAMPLE 4

A sample having an $\alpha$-$Al_2O_3$ layer was prepared as described in Example 1. Following firing at 1410° C. to bond the $\alpha$-$Al_2O_3$ to the cordierite tube, an additional layer of finer alumina particles was coated by slip casting to form a membrane layer on the cordierite support.

The slip consisted of the following composition:

25 wt. % 1.5 micron alumina particles (Alcoa, type A-152);

73.2 wt. % deionized water;

0.6 wt. % nitric acid; and 1.2 wt. % poly(vinyl alcohol).

The slip was mixed at high speed for a short time then set on a magnetic stir plate and stirred to maintain the suspension. Small additions of an anti-foaming agent were added to the slip to reduce/eliminate foaming. The cordierite tube support having a layer of $Al_2O_3$ as in Example 1 was coated as described above. Subsequently, the tube was fired at 1250° C. for two hours and a heating/cooling rate of 2° C./min was used. The second layer adhered well to the first layer and could only be removed by vigorous scraping with a steel probe. The pore size distribution that results from the addition of this layer is given in FIG. 1.

EXAMPLE 5

A base cordierite square channel tube of the same type as described in Example 1 was coated with a slip of the following composition:

33 wt. % 1.5 micron alumina particles (Alcoa, type A-152);

65.2 wt. % deionized water;

0.6 wt. % nitric acid; and 1.2 wt. % poly(vinyl alcohol).

The slip was mixed at high speed for a short time then set on a magnetic stir plate and stirred to maintain the suspension. Small additions of an anti-foaming agent were added to the slip to reduce/eliminate foaming. The cordierite tube was then coated as described above and dried in air for 20 minutes and in an oven at 90° C. for one hour. Subsequently, the tube was fired at 1250° C. for two hours and a heating/ cooling rate of 2° C./min was used.

Following firing, the interparticle bonding and adhesion to the cordierite support were tested qualitatively by scraping with a steel probe. It was found that the A-152 layer could be delaminated relatively easily from the cordierite support which is indicative of poor layer adhesion. However, because the A-152 layer came off in flakes (as opposed to a powder), it indicates that good interparticle bonding was achieved due to sintering of the A-152 particles. Hence, although sintering of the smaller particles, i.e., A-152, is achieved at a temperature of 1250° C., this is an insufficient criterion for good bond strength to the cordierite substrate.

While the invention has been described in terms of preferred embodiments, the claims appended hereto are intended to encompass other embodiments which fall within the spirit of the invention.

What is claimed is:

1. A ceramic fired composite filter media having a uniform pore size, the media consisting essentially of:

(a) a porous cordierite substrate having a surface having pores of non-uniform diameter, said diameter ranging from <1 to 200 μm; and (b) a layer of porous ceramic oxide having pores having a uniform diameter bonded to said surface of said cordierite substrate by heating at a temperature in the range of 1000° to 1500° C., said layer of ceramic oxide comprised of ceramic oxide particles having an average particle size greater than 1 μm to avoid penetration of said pores in said surface of said cordierite.

2. The composite filter media in accordance with claim 1 wherein the ceramic oxide particles have an average diameter equal to or greater than the diameters of the pores which account for >80% of the total pore volume of said cordierite.

3. The composite filter media in accordance with claim 1 wherein the ceramic oxide particles have an average diameter equal to or greater than the diameters of the pores which account for >60% of the total pore volume of said cordierite.

4. The composite filter media in accordance with claim 1 wherein the ceramic oxide particles have an average diameter equal to or greater than the diameters of the pores which account for >40% of the pore volume of said cordierite.

5. The composite filter media in accordance with claim 1 wherein said ceramic oxide comprises at least one of the group consisting of alumina, silica, zirconia and titania.

6. The composite filter media in accordance with claim 1 wherein said filter media is tubular shaped or disk shaped.

7. The composite filter media in accordance with claim 1 wherein said media has honeycomb configuration having multiple parallel passages.

8. The composite filter media in accordance with claim 1 wherein said ceramic oxide is bonded to said cordierite resulting from firing said composite filter media at a temperature in the range 1300° to 1430° C.

9. The composite filter media in accordance with claim 1 wherein said ceramic oxide layer is comprised of multiple layers of ceramic oxide particles.

10. The composite filter media in accordance with claim 1 wherein said porous ceramic oxide layer has a non-porous membrane layer bonded thereto.

11. A ceramic composite filter media having a uniform pore size, the media consisting essentially of:

(a) a porous cordierite substrate having a surface having pores and surface defects of non-uniform diameter, said diameter ranging from <1 to 200 μm; and (b) a layer of porous ceramic oxide particles having an average particle size in the range of greater than 1 μm to 18 μm bonded to said cordierite, the bonding resulting from firing said composite filter media at a temperature in the range of 1000° to 1500° C.

12. A ceramic composite filter media having a uniform pore size, the media consisting essentially of:

(a) a porous cordierite substrate having a surface having pores and surface defects of non-uniform diameter, said diameter ranging from <1 to 200 μm; and (b) a layer of porous ceramic oxide bonded to said cordierite resulting from firing said composite filter media at a temperature in the range of 1200° to 1450° C.

13. The composite filter media in accordance with claim 12 wherein subsequent ceramic oxide layers are comprised of ceramic oxide particles having a size smaller than the ceramic oxide particles bonded to said cordierite.

14. A ceramic fired composite filter media having a uniform pore size, the media consisting essentially of:

(a) a porous cordierite substrate having a surface having pores and surface defects of non-uniform diameter, said diameter ranging from <1 to 200 μm; and (b) a layer of porous ceramic oxide having pores of a uniform diameter bonded to said surface of said cordierite substrate, said layer of ceramic oxide comprised of ceramic oxide particles having an average particle size greater than 1 μm to avoid penetration of said pores and to cover substantial defects in said surface of said cordierite, said ceramic oxide layer comprised of at least one of the group consisting of alumina, silica, zirconia and titania, said bonding resulting from firing said composite filter media in a temperature range of 1200° to 1450° C.

* * * * *